United States Patent

Jackson et al.

Patent Number: 5,865,009
Date of Patent: Feb. 2, 1999

[54] RUBBER EXPANSION JOINT

[76] Inventors: Johnnie Jackson; Willie Mae Jackson, both of 3012 9th Ave. Dr. E., Palmetto, Fla. 34221

[21] Appl. No.: 927,752

[22] Filed: Sep. 11, 1997

[51] Int. Cl.$^6$ ............................. E02D 29/16; E04B 1/68
[52] U.S. Cl. ................ 52/745.2; 52/DIG. 9; 52/396.02; 52/396.04; 241/DIG. 31; 428/903.3; 264/912
[58] Field of Search ........................... 52/396.02, 396.04, 52/294, 745.19, 745.2, DIG. 9, 169.5; 241/DIG. 31, 22, 24, 17; 156/94; 404/47, 74; 428/903.3; 264/912, DIG. 66

[56] References Cited

U.S. PATENT DOCUMENTS

| | | | |
|---|---|---|---|
| 1,818,005 | 8/1931 | Oden | 52/396.04 |
| 3,027,599 | 4/1962 | Pluhacek et al. | |
| 4,058,947 | 11/1977 | Earle et al. | 52/396 |
| 4,970,043 | 11/1990 | Doan et al. | 264/237 |
| 5,094,905 | 3/1992 | Murray | 428/218 |
| 5,221,702 | 6/1993 | Richards | 524/59 |
| 5,316,708 | 5/1994 | Drews | 264/40.5 |
| 5,375,777 | 12/1994 | Pehrson | 241/22 |
| 5,411,216 | 5/1995 | O'Keefe | 214/24 |
| 5,634,599 | 6/1997 | Khais et al. | 241/23 |
| 5,714,219 | 2/1998 | Mashunkashey et al. | 428/36.1 |
| 5,733,943 | 9/1998 | Doan | 521/41 |
| 5,800,754 | 9/1998 | Woods | 264/115 |

FOREIGN PATENT DOCUMENTS 539224  7/1955  Belgium ................... 52/294

*Primary Examiner*—Robert Canfield

[57] ABSTRACT

A new rubber expansion joint for preventing distortions, cracks, and breaks in building materials normally caused by thermal movement. The invention includes a method of making an expansion joint member from used tires and using the resulting expansion joint member by installing it into a structure to create an expansion joint.

6 Claims, 3 Drawing Sheets

RUBBER EXPANSION JOINT

BACKGROUND OF THE INVENTION

1. Field of the Invention

The present invention relates to methods of making expansion joints and more particularly pertains to a new rubber expansion joint for preventing distortions, cracks, and breaks in building materials normally caused by thermal movement.

2. Description of the Prior Art

The use of methods of making expansion joints is known in the prior art. More specifically, methods of making expansion joints heretofore devised and utilized are known to consist basically of familiar, expected and obvious structural configurations, notwithstanding the myriad of designs encompassed by the crowded prior art which have been developed for the fulfillment of countless objectives and requirements.

Known prior art methods of making expansion joints and related objects include U.S. Pat. No. 4,736,558; U.S. Pat. No. 4,058,947; U.S. Pat. No. Des. 285,006; U.S. Pat. No. 5,424,118; U.S. Pat. No. 4,346,542; U.S. Pat. No. 4,279,954; U.S. Pat. No. 5,411,216; U.S. Pat. No. 5,605,721; U.S. Pat. No. 4,058,947; U.S. Pat. No. 5,514,722; U.S. Pat. No. 5,472,750; U.S. Pat. No. 5,536,110; U.S. Pat. No. 5,513,925; and U.S. Pat. No. 5,385,953.

While these devices fulfill their respective, particular objectives and requirements, the aforementioned patents do not disclose a new rubber expansion joint. The inventive device includes a method of making an expansion joint member from used tires and using the resulting expansion joint member by installing it into a structure to create an expansion joint.

In these respects, the rubber expansion joint according to the present invention substantially departs from the conventional concepts and designs of the prior art, and in so doing provides an apparatus primarily developed for the purpose of preventing distortions, cracks, and breaks in building materials normally caused by thermal movement.

SUMMARY OF THE INVENTION

In view of the foregoing disadvantages inherent in the known types of methods of making expansion joints now present in the prior art, the present invention provides a new rubber expansion joint construction wherein the same can be utilized for preventing distortions, cracks, and breaks in building materials normally caused by thermal movement.

The general purpose of the present invention, which will be described subsequently in greater detail, is to provide a new rubber expansion joint apparatus and method which has many of the advantages of the methods of making expansion joints mentioned heretofore and many novel features that result in a new rubber expansion joint which is not anticipated, rendered obvious, suggested, or even implied by any of the prior art methods of making expansion joints, either alone or in any combination thereof.

To attain this, the present invention generally comprises a method of making an expansion joint member from used tires and using the resulting expansion joint member by installing it into a structure to create an expansion joint.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new rubber expansion joint apparatus and method which has many of the advantages of the methods of making expansion joints mentioned heretofore and many novel features that result in a new rubber expansion joint which is not anticipated, rendered obvious, suggested, or even implied by any of the prior art methods of making expansion joints, either alone or in any combination thereof.

It is another object of the present invention to provide a new rubber expansion joint which may be easily and efficiently manufactured and marketed.

It is a further object of the present invention to provide a new rubber expansion joint which is of a durable and reliable construction.

An even further object of the present invention is to provide a new rubber expansion joint which is susceptible of a low cost of manufacture with regard to both materials and labor, and which accordingly is then susceptible of low prices of sale to the consuming public, thereby making such rubber expansion joint economically available to the buying public.

Still yet another object of the present invention is to provide a new rubber expansion joint which provides in the apparatuses and methods of the prior art some of the advantages thereof, while simultaneously overcoming some of the disadvantages normally associated therewith.

Still another object of the present invention is to provide a new rubber expansion joint for preventing distortions, cracks, and breaks in building materials normally caused by thermal movement.

Yet another object of the present invention is to provide a new rubber expansion joint which includes a method of making an expansion joint member from used tires and using the resulting expansion joint member by installing it into a structure to create an expansion joint.

Still yet another object of the present invention is to provide a new rubber expansion joint that is producible of recycled material.

Even still another object of the present invention is to provide a new rubber expansion joint that is more durable and lasts longer than those made of conventional fibrous material.

Even still yet another object of the present invention is to provide a new rubber expansion joint that creates a tight seal, keeping radon gas and termites out of the structure in which used.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
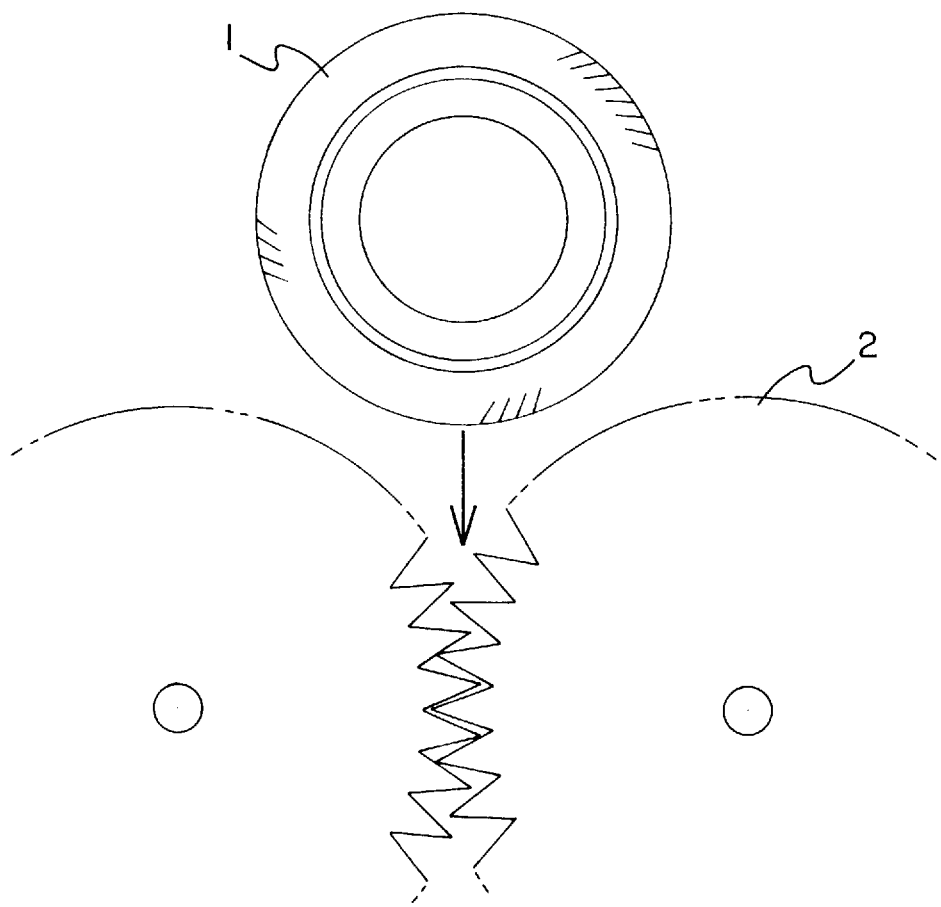
FIG. 1 is a schematic view of a tire grinding means.

With reference now to the drawings, and in particular to FIGS. 1 through 5 thereof, a new rubber expansion joint embodying the principles and concepts of the present invention and generally designated by the reference numeral 10 will be described.

As best illustrated in FIGS. 1 through 5, a method for making the rubber expansion joint 10 generally comprises the steps of providing tires 1, grinding the tires 1 into a collection of granulized particles that include granulized rubber particles, separating the granulized rubber particles from the collection of granulized particles, mixing the granulated rubber particles with a binder, and forming an expansion joint member 20 from the mixture of granulated rubber particles and binder.

Preferably, used tires 1 are used in the process because they are cheap and easy to obtain. Recycling used tires 1 in this manner also creates an alternative to simply dumping the tires 1 in a landfill or other disposal site.

The tires 1 are ground down to granulized particles by a tire grinding means 2 of a type known in the art. For example, an illustrative tire shredder and process for shredding tires is described in U.S. Pat. No. 5,411,216; Dennis O'Keefe; May 2, 1995. Preferably, the granules are small enough that the non-rubber granules may be separated from the rubber granules. The separation of the rubber granules from the non-rubber granules is accomplished with equipment known in the art. Such equipment may include a magnetic means (not shown) to attract, or a shaking means (not shown) to settle out, granules of steel belt. Such equipment may also include a cyclone (not shown) for removing lighter-than-rubber granules of polycord.

The rubber particles, once separated, are mixed with a binder to form a mixture. Preferably, a binder of a type known in the art is used. For example, an illustrative binder is described in U.S. Pat. No. 5,605,721; Joseph W. Di Geronimo; Jun. 7, 1995. The mixture is then formed into an expansion joint member 20 of any size and shape desired.

Figure 2:
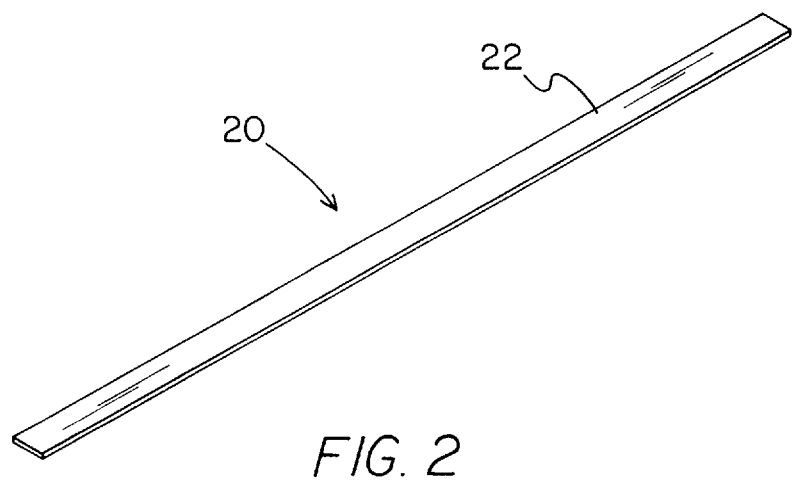
FIG. 2 is a perspective view of an expansion joint member of the present invention.

Preferably, as shown in FIG. 2, the expansion joint member 20 formed is elongate and rectangular in shape, just like conventional expansion joints. The formed expansion joint member 20 may also have a first surface 22 and a second surface (not shown). Ideally, the expansion joint member 20 is about one-half to about one inch in width and about three to about six inches in height. It may be formed in about twenty to thirty foot strips and rolled up for greater convenience. The expansion joint member may then be unrolled and cut to the desired length. In such an embodiment, the expansion joint member 20 may be used almost universally in place of conventional expansion joint members.

In another aspect of the present invention, the expansion joint member 20 formed in the above method is a new and useful construction material. Because rubber tire material is used, the expansion joint member 20 is more durable and lasts longer than conventional fibrous material, especially where the expansion joint 7 is exposed to the elements. Also, because rubber is used, the expansion joint member 20 is capable of forming a tight seal between elements of a structure, and is highly suitable for resisting the passage of radon gas and termites into a structure 3 when used in the outer perimeter of the enclosure of the structure. Furthermore, because the expansion joint member 20 is so durable, it may be recovered during demolition of a structure 3 in which it was utilized to form a rubber expansion joint 10 and reused to form a new rubber expansion joint 10 in a new construction.

In yet another aspect of the present invention, there is provided a method of using the expansion joint member 20 to form a rubber expansion joint 10 comprising making the expansion joint member 20 as set forth above and further comprising the steps of providing a structure 3 and installing the formed expansion joint member 20 into the structure 3, thus creating a rubber expansion joint 10 between portions of the structure 3.

Figure 3:
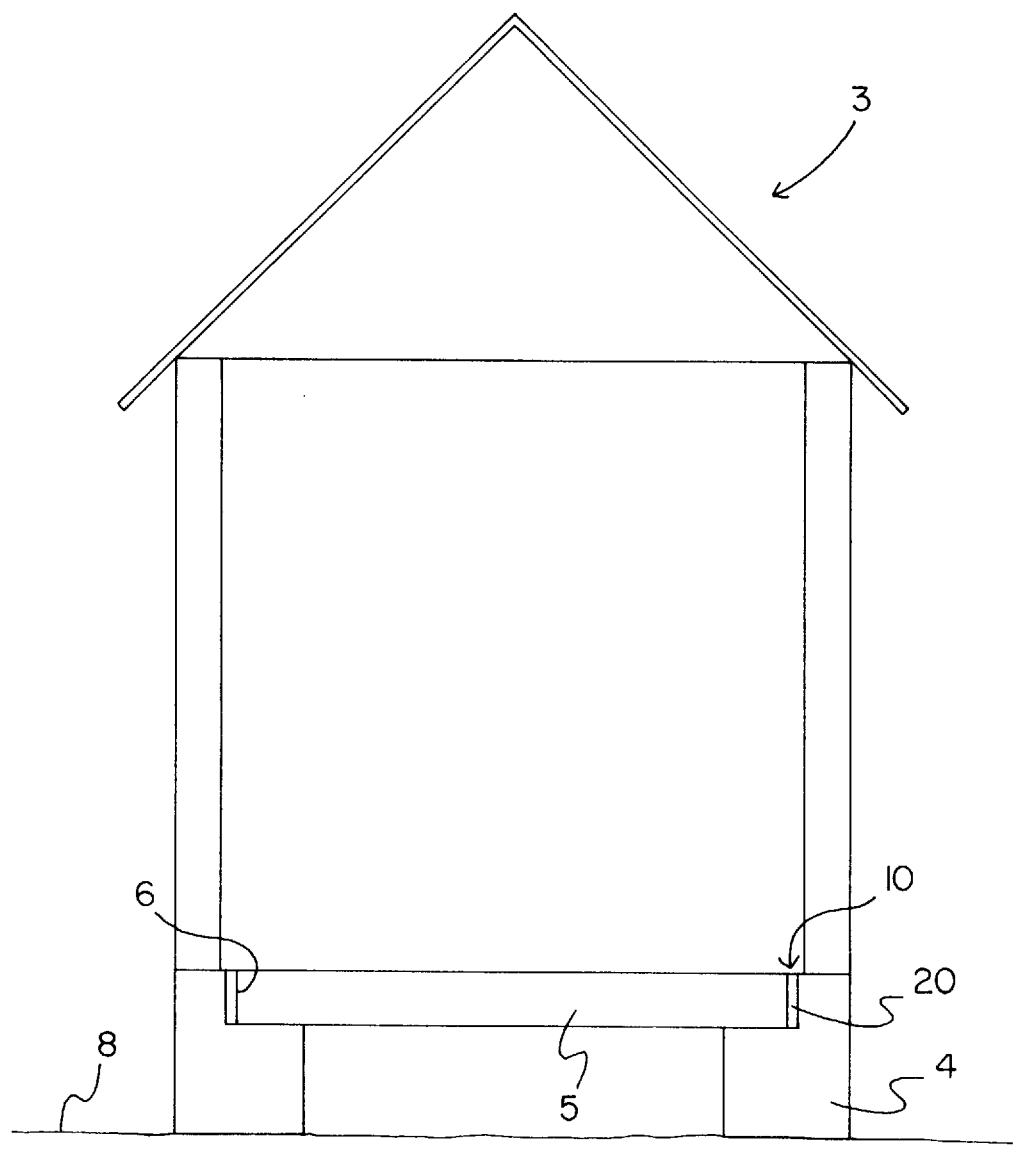
FIG. 3 is a schematic view of a structure with a rubber expansion joint mounted thereon.
Figure 4:
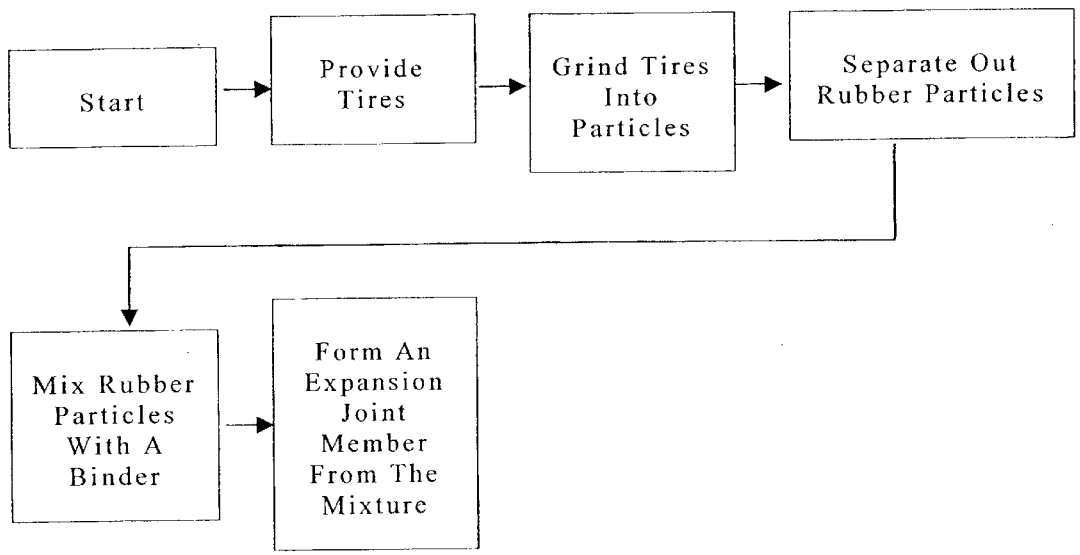
FIG. 4 is a flowchart illustrating the method of making an expansion joint member according to the present invention.
Figure 5:
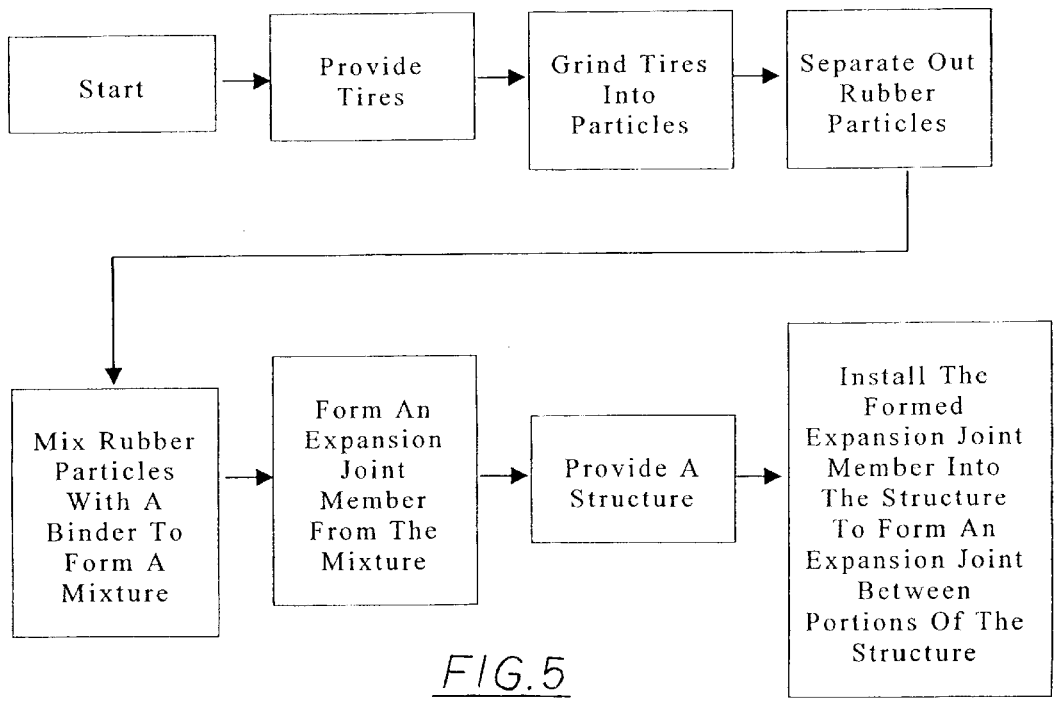
FIG. 5 is a flowchart illustrating the method of making and using an expansion joint member according to the present invention.

Preferably, as shown in FIG. 3, the structure 3 includes a plurality of foundation footers 4 that rest on or in a ground surface 8, and a floor structure 5 that rests on the foundation footers 4.

In the preferred method of using the expansion joint member 20, the expansion joint member 20 is installed into the structure 3. The expansion joint member 20 is interposed between the floor structure 5 and the foundation footers 4 to provide a rubber expansion joint 10 between the floor structure 5 and the foundation footers 4. Ideally, the floor structure 5 has a pair of opposite side ends 6, each opposite side end 6 being adjacent a foundation footer 4. An expansion joint member 10 is interposed between each opposite side end 6 and a foundation footer 4.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of making and using an expansion joint for installation into a structure, comprising the steps of:

(a) providing tires;

(b) grinding said tires to a collection of granulized particles including granulized rubber particles;

(c) separating granulized rubber particles from said collection of granulized particles;

(d) mixing said granulated rubber particles with a binder; and (e) forming an expansion joint member from the mixture of said granulated rubber particles and said binder;

(f) providing a structure; and (g) installing said formed expansion joint member into said structure to form an expansion joint between portions of said structure.

2. The method of claim 1, wherein said expansion joint member formed in step (e) is elongate and rectangular in shape.

3. The method of claim 2, wherein said formed expansion joint member has a first surface and a second surface.

4. The method of claim 1, wherein said structure provided in step (f) includes:

a plurality of foundation footers, said foundation footers being rested on a ground surface; and a floor structure being rested on said foundation footers.

5. The method of claim 4, wherein said expansion joint member installed into the structure in step (g) is interposed between said floor structure and said foundation footers to provide an expansion joint between said floor structure and said foundation footers.

6. The method of claim 5, wherein said floor structure has a pair of opposite side ends, each said opposite side end being adjacent a said foundation footer, and wherein a said expansion joint member is interposed between each said opposite side end and a said foundation footer.

* * * * *